United States Patent [19]

Burlock et al.

[11] Patent Number: 4,961,947

[45] Date of Patent: Oct. 9, 1990

[54] METHOD FOR SPLITTING CLOSED SHELL PISTACHIO NUTS

[75] Inventors: Charleton D. Burlock; Gerald E. Lemmons; David W. Williams, all of Bakersfield, Calif.

[73] Assignee: Dole Dried Fruit and Nut Company, Fresno, Calif.

[21] Appl. No.: 456,405

[22] Filed: Jan. 22, 1990

Related U.S. Application Data

[62] Division of Ser. No. 893,395, Aug. 5, 1986, Pat. No. 4,909,140.

[51] Int. Cl.$^5$ .............................................. A23P 1/00
[52] U.S. Cl. ................................... 426/482; 426/507
[58] Field of Search ............... 426/482, 481, 507, 518; 99/518, 574

[56] References Cited

U.S. PATENT DOCUMENTS 4,183,967 1/1980 Nelson et al. ..................... 426/482

*Primary Examiner*—George Yeung
*Attorney, Agent, or Firm*—Paul R. Wylie

[57] ABSTRACT

There is provided an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, the pistachio nuts are rotated, oriented and then split along their sutures in the annulus and subsequently discharged through an opening in the housing. There is also provided a continuous process of treating closed shell pistachio nuts which includes the step of removing the denser foreign particles from the closed shell nuts by flotation; and a soaking step so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described.

6 Claims, 6 Drawing Sheets

METHOD FOR SPLITTING CLOSED SHELL PISTACHIO NUTS

This is a divisional of copending application(s) Ser. No. 893,395 filed on 8-5-86 U.S. Pat. No. 4,909,140.

BACKGROUND OF THE INVENTION

Marketing requirements for pistachio nuts in the United States typically require that substantially all of the nuts have open sutures. Usually, 80 to 85% of a normal crop of pistachio nuts will have open sutures when they are picked from the tree. However, the remaining nuts generally referred to as "closed shell" nuts, are either only partially open or completely closed, in either case making them difficult to open by the consumer.

As used herein, the term "suture" refers to the longitudinal seam of the nut. When the suture is open, the seam is separated into two halves around one end of the pistachio nut and a majority of the length longitudinally of the nut.

There has existed a need for efficient and reliable techniques to split unopened or partially opened pistachio nuts in a uniform manner so that they resemble naturally opened nuts. It is important, that pistachio opening equipment be capable of operating at high speeds and that such equipment does not crack the shells of the unopened pistachio nuts other than along the sutures.

According to this invention, there is provided a continuous process of treating and splitting closed shell pistachio nuts, and a specific splitting apparatus to be used either alone or in conjunction with the other techniques and apparatus of the invention. Both the apparatus and the process developed are capable of continuous use for the rapid treatment and splitting of pistachio nuts.

DESCRIPTION OF THE PRIOR ART

U.S. Pat. No. 2,129,679, describes a nut shelling device wherein a conical mandrel is positioned within a conical outer casing to form downwardly diminishing space therebetween. However, this patent does not relate to the controlled splitting addressed by the invention disclosed herein wherein closed shell pistachio nuts are opened along the sutures thereof with the shells otherwise remaining intact.

Early U.S. Pat. No. 1,274,803, also discloses the use of an outer conical casing with a shaft mounted inner conical mandrel having a restriction therebetween with the nuts therein being shelled, rather than opened in the controlled manner of the present invention. U.S. Pat. No. 1,194,318 discloses a similar prior art structure relating to a nut cracker for separating the meats or kernels of nuts from their shells.

U.S. Pat. No. 2,220,320 also relates to a similar prior art apparatus for shelling nuts however, as in the above prior U.S. Patents the object is to completely free the nut meats from their shells without injury to the former.

BRIEF DESCRIPTION OF THE INVENTION

According to this invention, in one aspect thereof, there is provided an apparatus for splitting closed pistachio nuts in a controlled manner such that the longitudinal sutures of the nuts will be cracked open. The apparatus includes a cylindrical housing with a mandrel mounted for rotation therein to provide an annulus into which nuts can be introduced. According to various features of the apparatus, which will be described hereinafter, the pistachio nuts are rotated, oriented and then split along their sutures in the annulus and subsequently discharged through an opening in the housing.

A further aspect of the invention resides in a continuous process of treating closed shell pistachio nuts which include the steps of removing the denser foreign particles from the closed shell nuts by flotation; and, a soaking step is provided so that the shells of the unopened pistachio nuts will be saturated with water to provide a degree of shell flexibility such that when pressure is applied to the suture of the shell to effect splitting, the shell will flex rather than crack. The shells are subsequently surface dried and then introduced to a splitting operation of the type carried out by the apparatus previously described. In that process, the nuts are oriented in a manner such that pressure can be applied along a longitudinal seam of each nut so that it will be cracked along the suture.

In another aspect of the invention, an apparatus for carrying out the process described is provided which includes an apparatus for separating the closed shell pistachio nuts from those with open shells; a separation tank for removing the denser foreign particles from the pistachio nuts; a soaking apparatus to provide the requisite shell flexibility; drying means to provide the appropriate shell surface conditions and the splitting apparatus of the invention.

It was an object of this invention to provide techniques for the efficient opening of unopened pistachio nuts.

It was a further object of this invention to open unopened pistachio nuts in a rapid and efficient manner along their sutures such that the mechanically opened nuts would be of approximately the same appearance and specifications as those opened naturally during the growing process.

It was a further object of the invention to avoid the cracking and removal of shells from the nut meats during the opening process.

These and other objects of the invention will be more fully understood with reference to the accompanying drawings and the following description of the invention.

DESCRIPTION OF THE INVENTION

Figure 1:
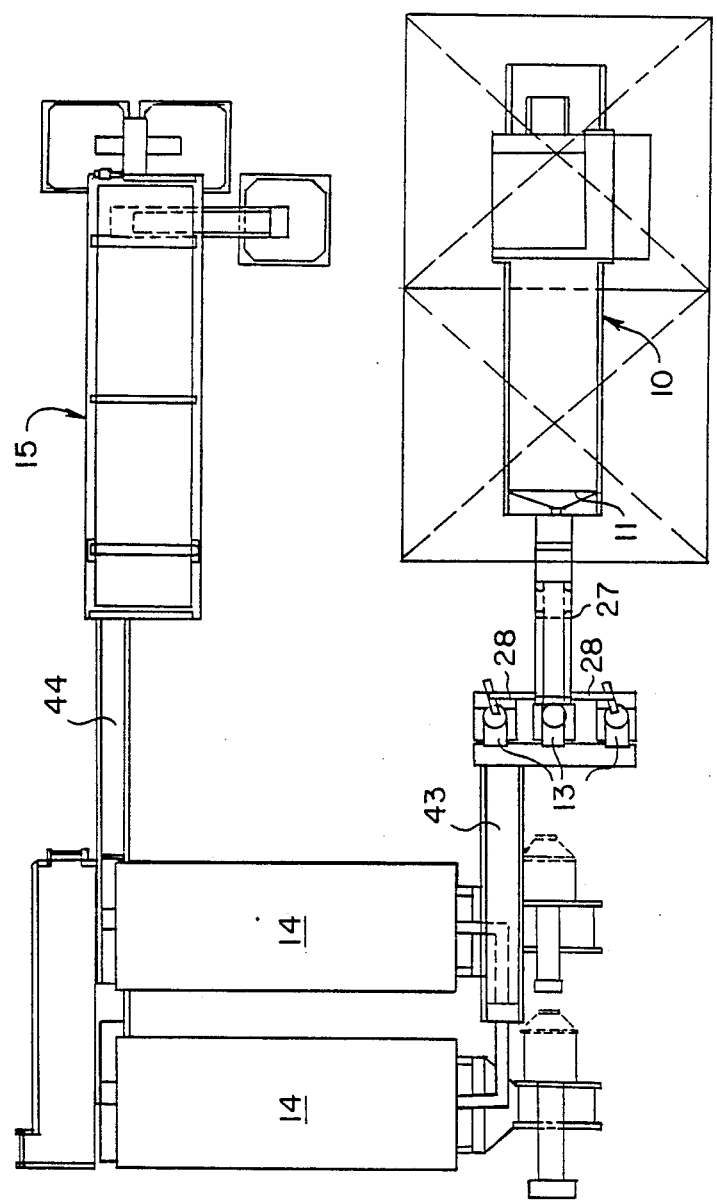
FIG. 1 is a top plan view of a layout of the overall apparatus for treating closed shell pistachio nuts to provide opened shell pistachio nuts according to the invention.
Figure 3:
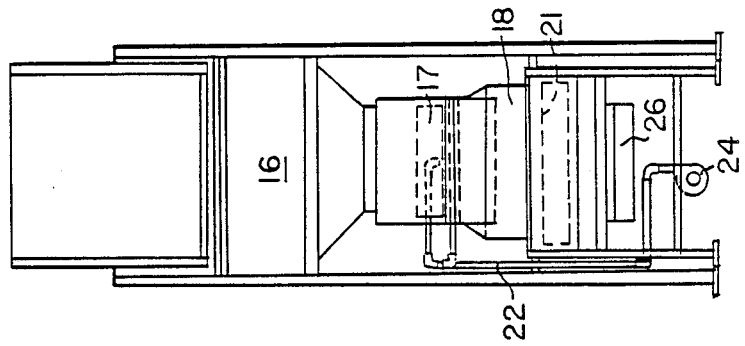
FIG. 3 is a right side view of the apparatus of FIG. 2.

Referring to the drawings, there is shown in FIG. 1 a layout of the apparatus according to this invention which includes soaking apparatus 10, drying hood 11 and a plurality of splitting apparatus 13, final drying units 14, and closed shell pistachio nut separator 15.

Figure 2:
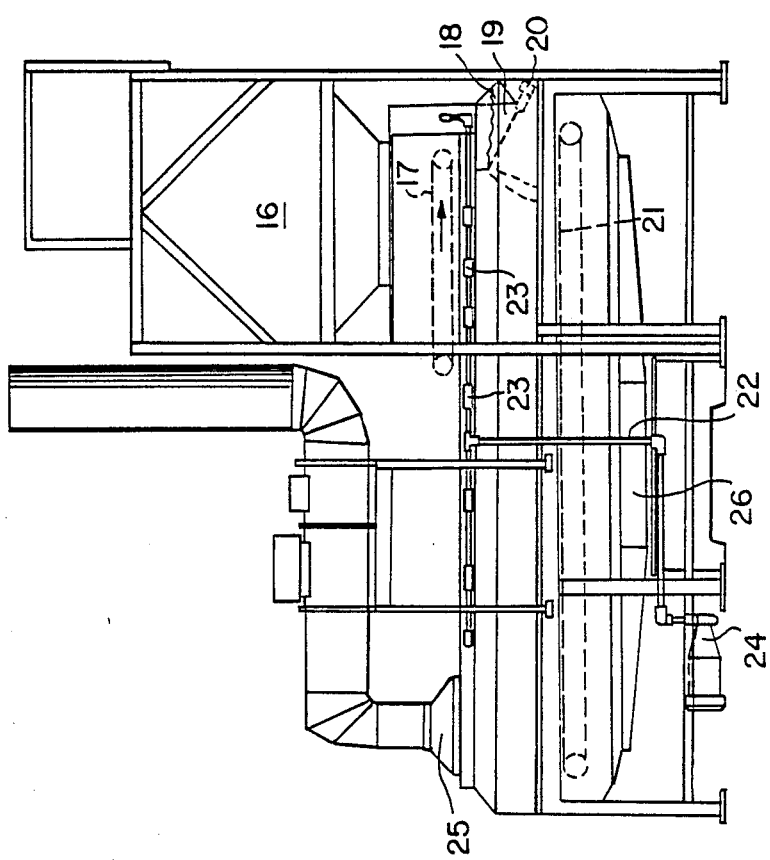
FIG. 2 is a side elevation view of the soaking and surface drying apparatus according to the invention showing a foreign particle separator in conjunction therewith.

Referring to FIG. 2, hopper 16 is provided over conveyor 17 and foreign particle separator 18. Foreign particle separator 18 is provided with appropriate plumbing fixtures (not shown) to provide a separating pool of water 19. Takeoff conduit 18 is provided to remove denser foreign particles.

Soaking apparatus 10 includes foraminous conveyor belt 21. Water conduits 22 are connected to spray heads 23 spaced above conveyor belt 21. Water is pumped to the spray heads 23 via conduits 22 by means of pump 24. Overlying the takeoff end of conveyor 21 is drying hood 25. The conveyor belt 21 is driven by appropriate drive means (not shown). Underlying conveyor belt 21 is trough 26 from which water is supplied to pump 24 by means of a conduit (not shown).

Conveyor 27 is positioned at the end of conveyor belt 21 to provide transportation of nuts coming from the soaking apparatus 10 to the pistachio splitting apparatus 13. Underneath the takeoff end of conveyor 27 are lateral transport chutes 28.

Figure 4:
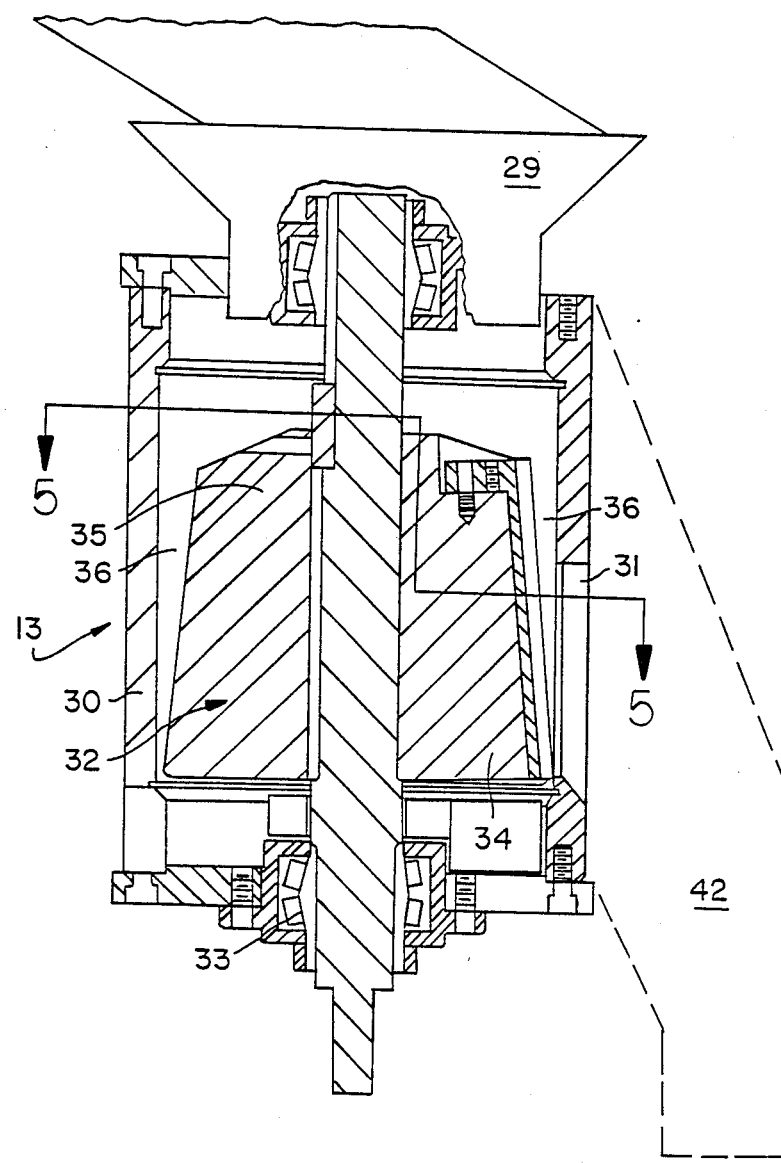
FIG. 4 is a view in cross-section of the splitting apparatus according to the invention.
Figure 5:
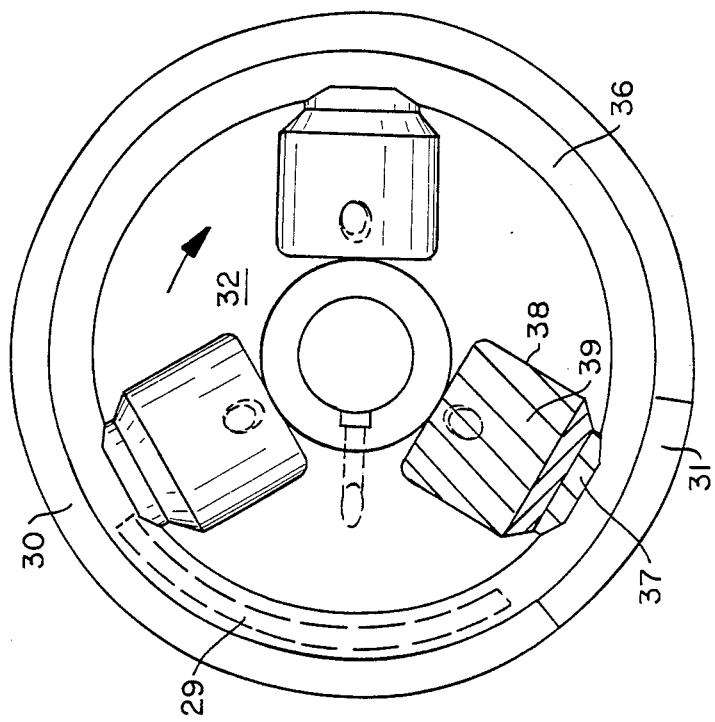
FIG. 5 is a top view in partial cross section of the apparatus of FIG. 4 taken on line 5—5 of FIG. 4.
Figure 7:
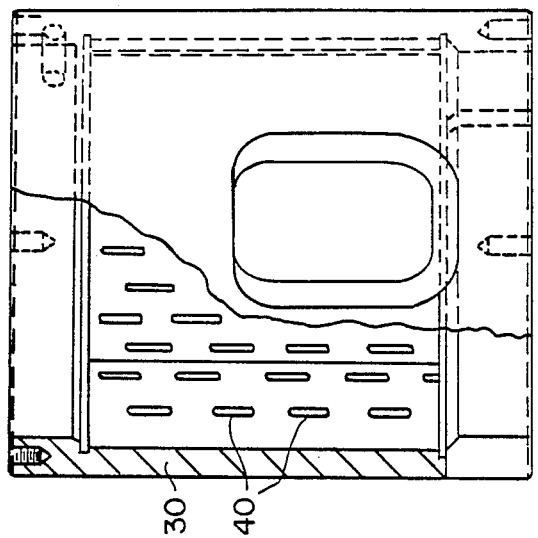
FIG. 7 is a right hand side view of the apparatus of FIG. 4 showing the discharge outlet and another preferred surface roughening.

As best seen in FIG. 4, pistachio splitting apparatus 13 has feed chute 29 mounted thereupon. The splitting apparatus 13 includes cylindrical housing 30 having a discharge opening 31. The discharge opening 31 is located in the lower portion of said housing 30 and is positioned circumferentially less than 360° from feed chute 29.

Mandrel 32 is mounted for rotation within cylindrical housing 30 by means of bearings 33. The mandrel is of conical configuration having a large diameter end 34 located adjacent the bottom of said cylindrical housing 29 and a small diameter end 35 adjacent the top of said housing to provide a tapered annulus 36. The tapered annulus 36 is of a size and configuration to orient pistachio nuts fed into its uppermost portion in a manner such that the longitudinal axis of said pistachio nuts are substantially aligned with the longitudinal axis of said mandrel at a point in said annulus where the maximum width of said pistachio nuts is less than the width of said pistachio of said annulus whereby the nuts will be cracked longitudinally along their sutures.

The sizing of mandrel 32, tapered annulus 36 and discharge opening 31 is such that the apparatus will effectively split and discharge pistachio nuts of various sizes with the larger nuts being split in a wider portion of the annulus 36 and the smaller nuts being split in a narrower portion thereof, with the height of the discharge opening covering all such portions so that the split nuts will be discharged.

In a preferred form of the invention, the bulk movement of pistachio nuts within annulus 36 is facilitated by propelling means protruding from the mandrel to contact the pistachio nuts and move them in the direction of rotation of the mandrel. In their preferred form, such means are shown as longitudinal abutments formed as flexible rubber inserts 37. These inserts are fitted into slots 38 in mandrel 32 being fastened to backing insert 39. The inserts 37 serve to push closed shell pistachio nuts in the direction of rotation of mandrel 32. Since the flexible material is also friction producing, wear of such material which reduces the outward reach of the abutment will still result in bulk movement of the pistachio nuts by friction.

Figure 6:
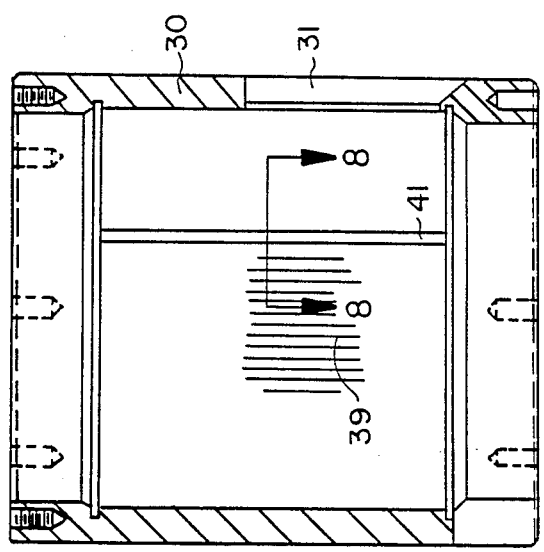
FIG. 6 is a view in cross-section of the housing element of FIG. 4 showing the discharge outlet and one form of a preferred surface roughening.
Figure 8:
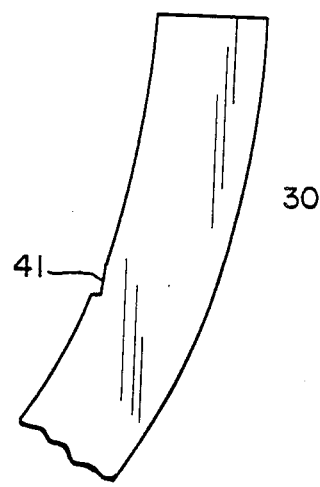
FIG. 8 is a view in cross-section taken on line 8—8 of FIG. 6.
Figure 9:
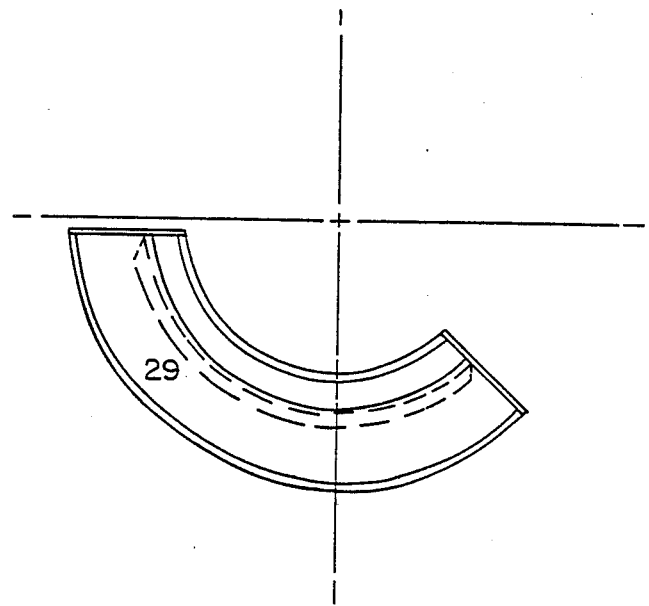
FIG. 9 is a top plan view of the feed chute for the splitting apparatus shown in FIG. 4.

On the inside surface of cylindrical housing 30 there is provided a roughened surface by means of either serrations 39 as shown in FIG. 6 or surface indentations in the form of slots 40. Additionally, a groove 41 extending longitudinally substantially the entire length of housing 30 is provided and such groove extends into the inner surface of cylindrical housing 30 a distance further than the depth of said serrations 39 to contact the closed pistachio nuts in a manner that will be subsequently described. As best shown in FIG. 8, the groove 41 has an angular cross-section.

In a preferred form of the invention, the slots 40 can be provided by lining the interior of cylindrical housing with a slotted sheet of wear resistant material.

Splitting apparatus 13 further includes a take off chute 42 (as shown in phantom lines on FIG. 4) to control and direct the split pistachio nuts being discharged through discharge opening 31. Such split nuts fall by gravity to conveyor 43 where they are transported to dryers 14 for drying and then discharged to conveyor 44. From conveyor 44, the split pistachio nuts are transported to pistachio nut separator where any of the closed shell pistachio nuts that still remain unopened are separated from the split pistachio nuts.

Separator 15, can be a conventional rotating needle type separator which picks the open shell pistachio nuts from the closed shell nuts by means of small needles which are inserted in the suture openings to pick up the open shell nuts.

In operation, closed shell pistachio nuts are initially then transported to hopper 16 for storage and metering onto conveyor belt 17 which travels at a slow speed and introduces the closed shell pistachio nuts to foreign particle separator 18. The separator 18, is a flotation type separator wherein the pistachio nuts, which have a specific gravity less than one, are floated on the surface of water pool 19 and the denser foreign particles are dropped down to be removed from take-off conduit 20. Water flow out of separator 18 transports the pistachio nuts which are then dropped onto slow moving conveyor belt 19 where they are contacted with water from spray heads 21.

In a preferred form of the invention, the quantity of water applied to the pistachio nuts or conveyor belt 19 ranges from about 100 gallons per minute to about 200 gallon per minutes per 1,000 pounds per hour of pistachio nuts. The bed depth of the pistachio nuts on conveyor belt 21 can vary between about 4 inches to about 12 inches dependent on the speed of the conveyor with a preferred quantity rate being about 250 pounds to about 1000 pounds per hour. The speed of conveyor 21 is about 4 inches per minute at a quantity of 1,000 pounds per hour to about 6 inches per minute with a total soak time range of about 1 to about 1.5 hours. Within the foregoing ranges, or other ranges to be determined, the soaking of the pistachio nuts can be varied to provide pistachio nuts with shells saturated sufficiently to provide shell flexibility for the splitting process, but not to the extent that the nut meat is soaked to a point where it is detrimental to quality.

It is preferred to use spray heads 23 having approximately ¼" diameter nozzles to evenly disperse the fresh water over the bed of unopened pistachio nuts.

Drying hood 25 is provided to contact the soaked pistachio nuts with hot air to sufficiently dry the surface of the shells so that the lubricity produced by excess surface moisture will be eliminated and there will be friction between the shell surface and the surfaces of splitting apparatus 13. In the preferred operation, the dryer uses about 4,000 to about 6,000 cubic feet per minute of air with a temperature in the range of about 130° F. to about 150° F. per 1,000 pounds per hour of pistachio nuts. The warm air can be generated by a two horsepower fan with a 0.8 m BTU burner (not shown) fired by natural gas.

The soaked and surface dried pistachio nuts are then introduced into pistachio splitting apparatus 13, of which three are shown in FIG. 1.

The rotational speed of mandrel 32 can be varied, however it is currently preferred to use a speed in the range of about 55 to about 60 revolutions per minute. Satisfactory results have been obtained in a range of about 15 to about 70 revolutions per minute.

Closed shell pistachio nuts are introduced by feeder chute 29 to the top of pistachio splitter 13 where they are spread radially around a position of the circumference of mandrel 32 and fall by gravity into tapered annulus 35. As the pistachio nuts are contacted by flexible rubber inserts 37 they are moved circumferentially in annulus 36 and as they contact serrations 39, or slots 40, they are rotated, all the while dropping further into the annulus 36 as their size permits. When the nuts contact groove 41, they are for the most part rotated on a lateral axis thereof to an attitude where the longitudinal axis of the pistachio nut is substantially parallel to the longitudinal axis of mandrel 32. In this position, the pistachio nuts are rotated around their longitudinal axis until the widest point of the nut, which is at the suture line, is wedged between the housing and the mandrel splitting cracking along the suture. Controlled cracking along the suture line is facilitated by the flexibility of the shell of the pistachio nut as provided by the soaking process described above which results in the shell being split along the suture rather than cracked randomly through the material of the shell. The split pistachio nuts are then discharged through discharge opening 31 and subsequently dried in dryers 14 and subjected to a final separation process in separation 15.

An additional advantage of the invention is that incidental feeding of opened shell pistachio nuts to splitting apparatus 13 will not result in shelling of an appreciable amount of the nuts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A continuous process of treating and splitting closed shell pistachio nuts in a controlled manner comprising:
    (a) contacting said closed shell pistachio nuts with water of sufficient quantity and for a sufficient time to saturate the shells of said pistachio nuts to provide a degree of shell flexibility whereby pressure applied to the longitudinal suture of said closed shell pistachio nuts will result in flexure of the shell;
    (b) drying the surface of said closed shell pistachio nuts; and
    (c) splitting said closed pistachio nuts by positioning said nuts to apply pressure along the longitudinal suture of the shells thereof and then applying pressure to said longitudinal suture whereby the longitudinal suture of said pistachio nut will be cracked and the pressure transmitted to said shell, other than to said longitudinal seam will result in flexure of said shell.

2. A continuous process according to claim 1 wherein the closed shell pistachio nuts are a continuously moving mass, and are contacted with water by means of water sprays.

3. A continuous process according to claim 2 wherein the water is applied to said closed shell pistachio nuts at a quantity and rate of about 100 to about 200 gallons per minute of water per 1,000 lbs. per hour of continuously moving closed shell pistachio nuts.

4. A continuous process according to claim 3 wherein the bed depth of said continuously moving closed shell pistachio nuts is from about 4 inches to about 12 inches.

5. A continuous process according to claim 2 wherein the soak time of the continuously moving closed shell pistachio nuts is about 1 to about 1.5 hours.

6. A continuous process according to claim 3 wherein said drying is accomplished by using about 4,000 to about 6,000 cubic feet per minute of air in a temperature range of about 130° F. to about 150° F. per about 1,000 lbs. per hour of pistachio nuts.

* * * * *